Patented Feb. 15, 1949

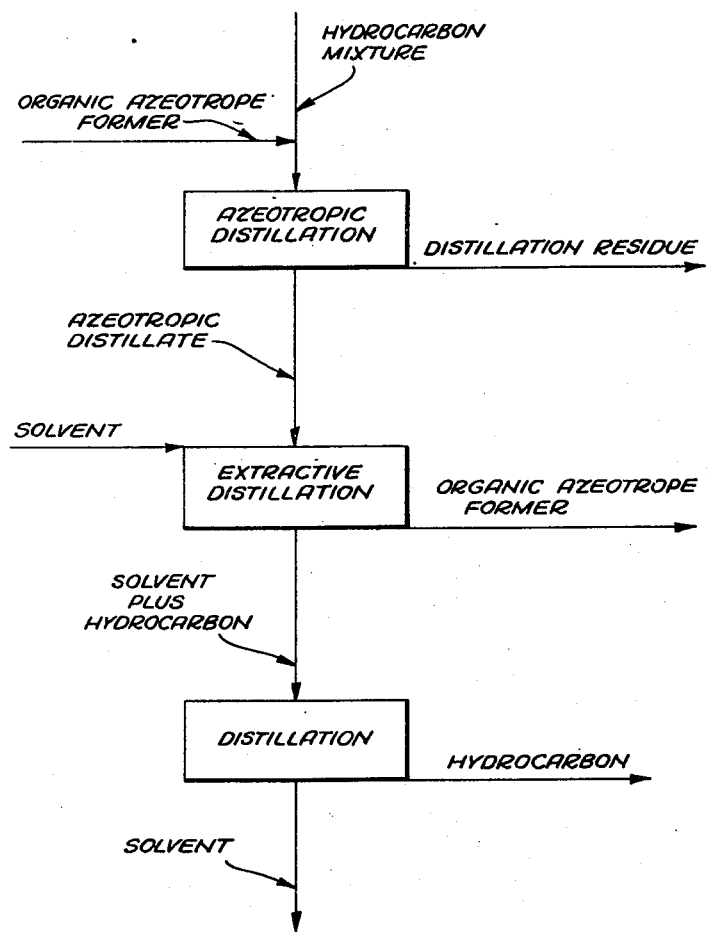

2,461,993

UNITED STATES PATENT OFFICE 2,461,993

HYDROCARBON SEPARATION BY AZEOTROPIC DISTILLATION

Art C. McKinnis, Los Angeles, Calif., assignor to Union Oil Company of California, Los Angeles, Calif., a corporation of California Application August 23, 1943, Serial No. 499,736

6 Claims. (Cl. 202—42)

This invention relates to the preparation of pure hydrocarbons from complex petroleum fractions, fractions of coal tar or other hydrocarbon mixtures, whose components have small differences in boiling points which renders them inseparable by ordinary fractional distillation.

An object of my invention is to separate one or more hydrocarbons or classes of hydrocarbons from a complex hydrocarbon fraction by distilling said complex hydrocarbon fraction in the presence of an azeotrope former and particularly to provide an efficient method of separating the azeotrope former from the hydrocarbon material present in an azeotropic distillate.

Other objects, features and advantages of my invention will be apparent to those skilled in the art as the description thereof proceeds and from the examples submitted herein.

The invention, which is illustrated in the diagrammatic drawing, comprises adding to such hydrocarbon fractions from which it is desired to segregate a specific hydrocarbon or hydrocarbon component, a substance hereinafter disclosed having a preferential affinity for one or more components contained in said petroleum fractions, thus causing a disturbance of the vapor pressure equilibrium that formerly existed in the fractions in such a manner that the partial vapor pressure or fugacity of at least one component in the fraction is changed sufficiently to permit its separation by controlled fractional distillation. In this type of fractional distillation, which is referred to herein as azeotropic distillation, the added substance or azeotrope former distills over with one or more hydrocarbons or hydrocarbon components as an azeotrope.

The invention further comprises adding to such azeotropes from which it is desired to separate the azeotrope former another substance hereinafter disclosed having a preferential affinity for the hydrocarbon material contained in said azeotrope, thus causing a disturbance of the vapor pressure equilibrium that formerly existed in the azeotropic mixture in such a manner that the partial vapor pressure or fugacity of the hydrocarbon material is changed sufficiently to permit the separation of the azeotrope former by controlled fractional distillation. In this type of fractional distillation, which is referred to herein as extractive distillation, the added substance, or solvent, remains as a distillation bottoms together with the hydrocarbon material and after vaporizing the azeotrope former the hydrocarbon remaining in the residue is separately vaporized leaving the solvent as a distillation residue.

According to my invention the separation of one or more hydrocarbons or hydrocarbon components from a mixture of hydrocarbons is accomplished by azeotropic distillation at ordinary atmospheric pressure, under superatmospheric pressures or under a vacuum, and involves adding an azeotrope former to the mixture of hydrocarbons and subjecting the resulting mixture to controlled fractional distillation. The addition of the azeotrope former to the hydrocarbon mixture results in forming a more volatile azeotrope with certain of the hydrocarbons which may then be distilled from the remaining hydrocarbons. Thus when it is desired to separate, for example, naphthene hydrocarbons from aromatic hydrocarbons the fractional distillation of this mixture to which an azeotrope former has been added results in the formation of an azeotrope consisting of the naphthene hydrocarbons and the azeotrope former which is more volatile than the aromatic hydrocarbons or an azeotrope of the aromatic hydrocarbons and azeotrope former. The fractional distillation of the mixture results in distilling overhead the naphthene hydrocarbons together with the azeotrope former leaving the aromatic hydrocarbons as undistilled bottoms which may or may not contain a portion of the azeotrope former depending upon the amount of azeotrope former used. The same procedure may be employed to separate paraffin and aromatic hydrocarbons and in this case the paraffin hydrocarbons form the lower boiling azeotrope with the azeotrope former. Likewise paraffin hydrocarbons may be separated from naphthene hydrocarbons in which case the paraffin hydrocarbons again form the lower boiling azeotrope and distill with the azeotrope former leaving the naphthene hydrocarbons as undistilled bottoms. Also, olefins may be separated from paraffins or naphthenes or aromatics or mixtures thereof. The olefins will be distilled over together with the azeotrope former in the case of treating mixtures of olefins and aromatics or remain as a residue when treating mixtures free from aromatics and containing paraffins and/or naphthenes. The azeotropic distillation process of my invention may also be applied to separating relatively olefinic hydrocarbons from relatively non-olefinic hydrocarbons as for example in separating butadiene from mixtures of butadiene containing monoolefins and/or paraffins. In such azeotropic distillations the relatively non-olefinic hydrocarbons, i. e., the paraffins and/or olefins, form an azeotrope with the added azeotrope former and are vaporized leaving the relatively olefinic hydrocarbon or butadiene as a distillation residue. It is also within the scope of my invention to use the azeotropic distillation process to separate hydrocarbons of the same class boiling in the same temperature range, such as when isolating isomers of aromatic hydrocarbons, such as ortho-, meta-, and para-xylene.

While it is preferred to effect the fractional distillation in such manner that one of the components in the hydrocarbon fraction remains as an undistilled bottoms, it is also possible to distill the mixture of hydrocarbons completely with the azeotrope former and then by controlled fractionation in a fractionating column effect the condensation of the separate hydrocarbon components at various points in the fractionating column from which the various components may be removed.

In such cases where the hydrocarbon fraction contains more than two components of different chemical characteristics as for example paraffin, olefin and diolefin hydrocarbons and it is desired to separate one or more of these components from the other component or components, the separation may be accomplished by stage fractional distillation to remove first one component and then another component. For example, an azeotrope former such as methyl nitrite may be added to a cracked or dehydrogenated fraction of petroleum containing C4 paraffin, olefin and diolefin hydrocarbons and the resulting mixture distilled under carefully controlled conditions, such that there is distilled an azeotrope comprising the paraffin hydrocarbons and a portion of the methyl nitrite and when substantially all of the paraffin hydrocarbons have been vaporized the distillation temperature is increased to distill an azeotrope comprising the monoolefin hydrocarbons and more of the methyl nitrite leaving the diolefin hydrocarbon as a distillation residue substantially completely separated from paraffin and olefin hydrocarbons.

In a second example of azeotrope former such as acetone may be added to a mixture of benzene and naphthene and paraffin hydrocarbons boiling in the temperature range of about 150° F. to 200° F., and the mixture then distilled to remove as overhead fractions, first an azeotrope of the paraffin hydrocarbons with acetone and then an azeotrope of the naphthene hydrocarbons with more of the acetone, leaving benzene as undistilled bottoms either containing acetone or not, depending on the quantity of acetone added to the mixture of hydrocarbons. The point at which one component, the paraffin hydrocarbons, for example, is substantially completely distilled from the remaining components may be observed by a rise in the distillation temperature in order to effect further distillation of the material in the still. Thus, in the above example, if the distillation is initially carried out at ordinary atmospheric pressure and at an overhead temperature of about 130° F. the paraffin hydrocarbons together with acetone distill from the remaining hydrocarbon components. Then when substantially all of the paraffin hydrocarbons have been distilled it will be necessary to raise the distillation temperature to about 132° F. in order to effect the distillation of the naphthene hydrocarbons together with additional quantities of the azeotrope former. The benzene will remain as a distillation bottoms substantially completely separated from non-aromatic hydrocarbons. By carrying out the distillation at the temperature at which the highest boiling non-aromatic hydrocarbon azeotrope distills, it is possible to distill overhead all of the non-aromatic hydrocarbons simultaneously. The benzene or benzene and acetone remaining as a bottoms or residue in the above distillation may be further distilled by increasing the distillation temperature to about 134° F. at which point acetone will vaporize and after substantially all of the acetone has volatilized the temperature may be further increased to about 175° F. which will result in distilling overhead the benzene substantially completely separated from non-aromatic hydrocarbons and acetone or if desired the benzene may be removed as a distillation residue. Thus by careful control of the distillation temperature it is possible to remove the various components present in the original feed stock as separate fractions.

Azeotrope formers which are useful for segregating substantially pure hydrocarbons or classes of hydrocarbons, e. g., aromatic hydrocarbons, from complex hydrocarbon fractions of relatively narrow boiling range in accordance with the principles of my invention include aliphatic ketones, such as acetones, methyl ethyl ketone, diethyl ketone, methyl isopropyl ketone, diacetyl and acetonyl acetone and also cyclic ketones such as cyclo hexanone and methyl phenyl ketone; fatty acids having three to nine carbon atoms, such as propionic, butyric, valeric, caproic, heptylic, nonylic acids and their branched chain isomers. Other useful azeotrope formers include phenolic compounds such as phenols, naphthols, cresols, xylenols, thymol, etc.; polyhydric phenols, such as resorcinol, pyrocatechol, pyrogallol, phloroglucinol, etc., and alkylated polyhydric phenols, such as 1-methyl-2,3-dihydroxy benzene, etc.; saturated hetrocyclic compounds having six membered rings in which at least one of the atoms in the ring is oxygen, nitrogen or sulfur, such as dioxane, oxane, piperidine, thiane, dimethyl dioxane, morpholine, thioxane, piperazine, dithiane, thioformaldehyde, etc., and the derivatives of such six membered ring compounds, such as dibutanol, N-ethylpiperidine, N-methyl morpholine, N-morpholine ethanol, N-phenyl morpholine, pentamethylene sulfone, etc.; the five membered ring compounds in which at least one of the atoms in the ring is oxygen, nitrogen or sulfur, such as oxolane, pyrrolidine, thiolane, dioxolane, methyl dioxolane, etc., and the derivatives of such five membered ring compounds, such as N-ethyl pyrrolidine, tetramethylene sulfide, tetra-hydrofurfuryl alcohol, etc.; the four membered ring compounds, such as trimethylene sulfide, tetramethylene oxide, trimethylenimine, etc., and the derivatives of such four membered ring compounds such as trimethylene sulfone, N-ethyl trimethylenimine, etc. Other azeotrope formers which are useful in separating pure aromatic hydrocarbons from complex hydrocarbon mixtures include monohydroxy alcohols, such as methyl, ethyl, propyl, isopropyl, and higher molecular weight normal and isomeric alcohols; polyhydric alcohols, such as mono, di, tri, tetra, hexa, and nonaethylene glycols; the ethers of these ethylene glycols, such as monomethyl, monoethyl, and monobutyl ethers of mono, di, tri, etc., ethylene glycols and the esters of the ethers of ethylene glycols, such as for example, the acetate of the monoethyl ether of ethylene glycol, propylene glycols and the ethers of propylene glycols, the esters of the ethers of propylene glycols, including propylene glycol and dipropylene glycol; and polyhydroxy alcohols including the trihydroxy and tetrahydroxy alcohols, such as glycerine and erythritol. Other classes of compounds which are effective in producing the above described separations include the nitroparaffins, such as nitromethane, nitroethane, 1,2-dinitropropane, 1,2-dinitro-n-butane, 1,2-dinitrotertiary butane, nitropentanes, and nitrohexanes; nitroalcohols, such as 2-nitro-1-ethanol, 2- and 3-nitro-1-propanol, etc.; the nitroderivatives of unsaturated aliphatic hydrocarbons, such as nitroethylene and nitropropylene; the halogenated derivatives of the aforementioned nitroparaffins and nitroalcohols, such as chloronitromethane, 1-chloro-1-nitroethane; nitroaromatic hydrocarbons, such as nitrobenzenes, nitrotoluenes, nitroxylenes, etc.; and alkyl nitrites including the normal and the various isomeric nitrites from methyl to octylnitrite. These azeotrope formers are all non-aqueous organic compounds.

The choice of the azeotrope former to be employed will generally depend upon the characteristics of the hydrocarbon stock to be treated since it is preferable to employ an azeotrope former which has a boiling point not more than about 100° F., and preferably not more than about 30° F. to 50° F., below the average boiling point of the hydrocarbon stock.

The azeotrope produced as overhead in an azeotropic distillation contains azeotrope former together with varying proportions of hydrocarbon material, the ratio of azeotrope former to hydrocarbon material being dependent upon the particular azeotrope former used, the character and boiling range of the hydrocarbon fraction being azeotropically distilled and upon the conditions of temperature and pressure employed for the distillation. The separation of azeotrope former from the hydrocarbon material contained in an azeotrope is generally effected by extraction with a third component or solvent which is soluble in the azeotrope former or which will dissolve the azeotrope former and which causes phase separation or stratification of the azeotrope, one of the phases containing the azeotrope former together with the added solvent and the other phase consisting of the hydrocarbon material. The phase containing the azeotrope former and solvent is subsequently distilled to separate the azeotrope former from the added solvent. This method of separation of the azeotrope former from an azeotrope requires a two stage operation, i. e., solvent extraction followed by distillation, and is often inefficient and costly because solvents which have good selectivity are not available.

According to my invention the separation of an azeotrope former of the type described hereinabove from an azeotrope is accomplished by extractive distillation at ordinary atmospheric pressure, under superatmospheric pressures, or under a vacuum and involves adding a solvent to the azeotrope being treated and subjecting the resulting mixture to controlled fractional distillation. The addition of the solvent to the azeotrope results in reducing the partial vapor pressure of the hydrocarbon material allowing the distillation of the azeotrope former. Thus when it is desired to separate, for example, an azeotrope former from the hydrocarbon component of an azeotrope the fractional distillation of the azeotrope to which a solvent has been added, said solvent being a solvent for the hydrocarbon component, results in vaporizing the azeotrope former which is more volatile than the solvent or the hydrocarbon component whose vapor pressure is apparently reduced by the solvent. After the azeotrope former as been completely distilled the distillation temperature is raised to such a point that the hydrocarbon component distills leaving the solvent as a distillation bottoms.

Although I may carry out the separation of azeotropes in the manner described above, I prefer to vaporize the azeotrope and pass it into a fractionating column at a point between about the bottom and the middle of the column and pass the solvent in a liquid condition into the same column at a point above that at which the vaporized azeotrope enters the column and preferably at a point between the middle and the top of the column. The liquid solvent flows downwardly through the column and scrubs the vapors rising in the column. The solvent may act as a reflux although its primary function is that of an extractive solvent dissolving and reducing the partial vapor pressure of the hydrocarbon component of the azeotrope.

The fractionating column may be of the packed type of it may be fitted with plates or trays or otherwise arranged to effect good contact between the solvent or reflux descending the column and the vaporized azeotrope ascending the column. Heat is supplied to the column by means of a reboiler at the base of the column and/or by heating and controlling the temperature of the vaporized azeotrope and the solvent entering the column.

The vapors leaving the top of the above described fractionating column and consisting of the azeotrope former originally present in the azeotrope are condensed and pumped to storage. The bottoms from this column, consisting of solvent and the hydrocarbon component of the azeotrope, are passed to a second fractionating column which is maintained at a temperature such that the component of the azeotrope is vaporized and distilled overhead leaving the solvent as a distillation residue. The overhead fraction is condensed and passed to storage and the distillation bottoms is returned as liquid feed to the top of the first fractionating column where it is reused as solvent.

Solvents which are useful for separating the above described non-aqueous organic azeotrope formers from azeotropic distillates obtained in the separation of specific hydrocarbons or hydrocarbon fractions from mixtures of hydrocarbons are hydrocarbons or hydrocarbon fractions having a boiling point or an initial boiling point higher than the maximum boiling point of the hydrocarbon component of the azeotrope being treated. These solvents should not form an azeotrope with the azeotrope former present in the azeotrope being treated. Solvents of this type will preferably consist of or comprise saturated hydrocarbons such as paraffin and naphthene hydrocarbons, highly branched chain paraffin hydrocarbons and mixtures of these hydrocarbons being particularly valuable. Thus solvents which are desirable according to my invention include the normal or branched chain paraffin hydrocarbons containing at least three carbon atoms per molecule, or mixtures of such hydrocarbons; naphthene hydrocarbons containing at least five carbon atoms such as cyclopentane, cyclohexane and the mono, di, tri, etc., alkyl substituted cyclopentanes and cyclohexanes or mixtures of such hydrocarbons; petroleum fractions such as petroleum naphtha, gasoline, kerosene, stove oil, gas oil, mineral lubricating oil fractions and petroleum waxes. In the case of petroleum fractions it is desirable to use solvent treated or acid and/or clay treated hydrocarbon oils since by such treatments the proportion of the less desirable hydrocarbons, e. g., olefin and aromatic hydrocarbons is reduced. Also it is desirable that the fractions employed have relatively narrow boiling ranges, i. e., the spread between the initial boiling point and the maximum boiling point of the hydrocarbon fraction used as the extractive solvent should preferably not be greater than about 50° F. although fractions having boiling point ranges up to about 200° F. may be employed in some instances.

The choice of solvent will generally depend upon the characteristics of the azeotrope being treated as well as upon the characteristics of the azeotrope former and/or the hydrocarbon component associated therewith in the azeotropic distillate. It is desirable that the solvent have a boiling point or, where a mixture of compounds is used as the solvent, an initial boiling point above the boiling point of the azeotrope to be treated as well as above the boiling point of the azeotrope former and the maximum boiling point of the hydrocarbon component of the azeotrope. Thus the boiling point or initial boiling point of the solvent should be at least 25° F. and preferably 50° F. to 200° F. or more above the boiling point of the azeotrope former or the maximum boiling point of the hydrocarbon component of the azeotrope whichever is the higher.

The following specific examples serve to illustrate my invention further:

Example I

To 100 parts by weight of a butadiene fraction of cracked petroleum containing about 50 parts by weight of butadiene, 40 parts by weight of butene-1 and isobutene and 10 parts by weight of butanes was added about 130 parts by weight of methyl nitrite and the resulting mixture was pumped into a fractionating column where it was subjected to fractionation. The column was provided with a heater or reboiler and was maintained at a pressure of 130 pounds per square inch. The distillation was controlled so as to distill overhead an azeotrope consisting of the butanes and butenes together with substantially all of the methyl nitrite. This separation was accomplished at a temperature of about 120° F.

The bottoms from the column was pumped to a second fractionating column where the temperature was maintained at about 120° F. and the pressure at 75 pounds per square inch and relatively pure butadiene was distilled overhead leaving as a residue the higher boiling hydrocarbons present in the feed to the azeotroping process and/or polymers or other reaction products produced during the distillation treatments.

The azeotrope containing methyl nitrite and $C_4$ paraffin and olefin hydrocarbons in the ratio of 4 parts by weight of the former to 1 part by weight of the latter was passed through a heater and the vapors were then passed into an extractive distillation column at a point near the base of the column. Normal pentane, used as the solvent in this case, was pumped into the same column at a point near the top of the column at such a rate that the ratio between n-pentane and $C_4$ hydrocarbon entering the column was 20 parts by weight of the former to 1 part of the latter. The column was maintained under a gage pressure of 130 pounds per square inch and under these conditions the methyl nitrite distilled overhead at a temperature of 120° F. The methyl nitrite was condensed and returned to the azeotropic distillation step.

The bottoms from the extractive distillation column, comprising the $C_4$ hydrocarbons and n-pentane were passed through a heater and into a fractionating column which was maintained at a gage pressure of 142 pounds per square inch. The distillation temperature was controlled so as to distill overhead all of the $C_4$ hydrocarbons, leaving n-pentane as a residue. The n-pentane was pumped from the bottom of this fractionating column through a cooler and back to the extractive distillation column where it was again used as solvent.

Example II

To 100 parts by weight of a fraction of hydroformed gasoline boiling in the temperature range of about 200° F. to about 240° F. and containing 70% toluene and 30% of non-aromatic hydrocarbons was added 150 parts by weight of methyl ethyl ketone and the mixture was distilled in a fractionating column at a vapor or still-head temperature of about 165° F. and a bottoms temperature of about 235° F. The overhead distillate from this operation consisted of an azeotrope of the non-aromatic hydrocarbons and the methyl ethyl ketone. The bottoms consisted of toluene substantially completely separated from non-aromatic hydrocarbons.

The azeotropic distillate was passed through a heater and thence to a second fractionating column operated as an extractive distillation column where it entered at a point near the bottom of the column in the form of a vapor. A fraction of gasoline raffinate having a boiling point range of about 300° F. to about 350° F., an A. P. I. gravity of 62° and prepared by fractionating the raffinate obtained by treating one volume of a straight-run gasoline with about 1–2 volumes of liquid sulfur dioxide at a temperature of about 10° F., was pumped into the column at a point near the top of the column at the rate of 100 parts by weight of the gasoline raffinate fraction to 5 parts by weight of the hydrocarbon component of the azeotropic distillate entering near the bottom of the column. The gasoline raffinate fraction flowed downward through the column contacting and scrubbing the azeotrope vapors ascending the column. The overhead distillate from this column, consisting of methyl ethyl ketone substantially completely separated from all hydrocarbon material, was condensed and returned to the azeotroping step.

The bottoms from the extractive distillation column was pumped through a heater and into a fractionating column where the non-aromatic hydrocarbon material originally present in the azeotrope with methyl ethyl ketone was distilled overhead at a temperature of about 168° F., leaving gasoline raffinate as a distillation bottoms. The bottoms from this fractionating column were returned to the extractive distillation step and reused as solvent in this process.

The foregoing description is not to be taken as in any way limiting but merely as illustrative of my invention for many variations may be made by those skilled in the art without departing from the spirit or scope of the following claims.

I claim:

1. A process for the treatment of a fraction of hydroformed gasoline boiling in the temperature range of about 200° F. to about 240° F. and containing toluene and non-aromatic hydrocarbons to separate toluene therefrom which comprises distilling said fraction of hydroformed gasoline in the presence of a sufficient amount of methyl ethyl ketone to vaporize said non-aromatic hydrocarbons together with said methyl ethyl ketone, thereby leaving toluene as a distillation residue substantially completely separated from non-aromatic hydrocarbons, separately distilling said vaporized mixture of methyl ethyl ketone and non-aromatic hydrocarbons in the presence of a fraction of gasoline raffinate boiling in the temperature range of about 300° F. to about 350° F. to vaporize said methyl ethyl ketone, thereby leaving substantially all of said non-aromatic hydrocarbons together with said fraction of gasoline raffinate as a distillation residue, and subsequently distilling said last named distillation residue to vaporize said non-aromatic hydrocarbons, thereby leaving said fraction of gasoline raffinate as a distillation residue.

2. A process for the treatment of a butadiene fraction of cracked petroleum containing about 50 parts by weight of butadiene, about 40 parts by weight of butenes and about 10 parts by weight of butanes to separate said butadiene from said butenes and butanes which comprises distilling said butadiene fraction in the presence of a sufficient amount of methyl nitrite to vaporize said butenes and butanes together with said methyl nitrite as an azeotrope thereby leaving butadiene in the residue substantially completely separated from said butenes and butanes, separately distilling said azeotrope in the presence of a sufficient amount of normal pentane to vaporize said methyl nitrite leaving substantially all of said butenes and butanes together with said normal pentane as a distillation residue, and subsequently distilling said last named distillation residue to vaporize said butenes and butanes thereby leaving said normal pentane as a distillation residue.

3. A process for the treatment of a complex hydrocarbon fraction to separate chemically similar hydrocarbon components from other chemically similar hydrocarbon components, different from said first named chemically similar hydrocarbon components contained in said complex hydrocarbon fraction, which components distill from said complex hydrocarbon fraction at approximately the same temperature, which comprises distilling said complex hydrocarbon fraction in the presence of a sufficient amount of an organic azeotrope former having a boiling point not more than about 50° F. below the average boiling point of said complex hydrocarbon fraction, to vaporize as an azeotrope chemically similar components together with said azeotrope former, thereby leaving chemically similar components in the residue, separately extractively distilling said azeotrope in the presence of a saturated hydrocarbon solvent having a preferential affinity for the hydrocarbon component of said azeotrope and having a boiling point at least 25° F. above the maximum boiling point of the hydrocarbon component of said azeotrope to produce as overhead the azeotrope former thereby leaving as distillation residue the hydrocarbon component of said azeotrope together with solvent and subsequently distilling said extractive distillation residue to vaporize the hydrocarbon component of said azeotrope thereby leaving said solvent as a distillation bottoms.

4. A process for the treatment of a complex hydrocarbon fraction to separate aromatic hydrocarbons from non-aromatic hydrocarbons which distill from said complex hydrocarbon fraction in the same temperature range as said non-aromatic hydrocarbons distill therefrom which comprises distilling said complex hydrocarbon fraction in the presence of a sufficient amount of an organic azeotrope former to distill as an azeotrope said non-aromatic hydrocarbons together with said azeotrope former, thereby leaving said aromatic hydrocarbons in the residue substantially completely separated from said non-aromatic hydrocarbons, said azeotrope former having a boiling point not more than about 30° F. to 50° F. below the average boiling point of said complex hydrocarbon fraction, separately distilling said azeotrope in the presence of a saturated hydrocarbon solvent having a preferential affinity for said non-aromatic hydrocarbons and having a boiling point at least 25° F. above the maximum boiling point of the hydrocarbon component of said azeotrope to vaporize said azeotrope former and leave as a distillation residue substantially all of the non-aromatic hydrocarbon component of said azeotrope together with said solvent and separately distilling the distillation residue comprising solvent and non-aromatic hydrocarbon component of said azeotrope to vaporize said non-aromatic hydrocarbon component of said azeotrope leaving said solvent as a residue.

5. A process for the treatment of a complex hydrocarbon fraction containing paraffins, monoolefins and diolefins to separate paraffins and monoolefins from diolefins which distill from said fraction in the same temperature range as said paraffins and monoolefins distill therefrom which comprises distilling said hydrocarbon fraction in the presence of a sufficient amount of an azeotrope former having a boiling point not more than about 50° F. below the average boiling point of said complex hydrocarbon fraction, to distill said paraffins and monoolefins together with said azeotrope former as an azeotrope thereby leaving said diolefins in the residue substantially completely separated from paraffins and monoolefins, separately extractively distilling said azeotrope in the presence of a sufficient quantity of a saturated hydrocarbon solvent having a preferential affinity for the hydrocarbon present in said azeotrope and having a boiling point at least 25° F. above the maximum boiling point of the hydrocarbon component of said azeotrope to vaporize said azeotrope former thereby leaving substantially all of said paraffins and monoolefins together with said solvent as a distillation residue and subsequently distilling said last named distillation residue to vaporize said paraffins and monoolefins thereby leaving said solvent as a distillation residue.

6. A process for the treatment of a complex hydrocarbon fraction containing paraffins, monoolefins and diolefins to separate paraffins and monoolefins from diolefins which distill from said fraction in the same temperature range as said paraffins and monoolefins distill therefrom which comprises distilling said hydrocarbon fraction in the presence of a sufficient amount of methyl nitrite which has a boiling point not more than about 50° F. below the average boiling point of said complex hydrocarbon fraction, to distill said paraffins and monoolefins together with said methyl nitrite as an azeotrope thereby leaving said diolefins in the residue substantially completely separated from paraffins and monoolefins, separately extractively distilling said azeotrope in the presence of a sufficient quantity of a saturated hydrocarbon solvent having a preferential affinity for the hydrocarbon present in said azeotrope and having a boiling point at least 25° F. above the maximum boiling point of the hydrocarbon component of said azeotrope to vaporize said methyl nitrite thereby leaving substantially all of said paraffins and monoolefins together with said solvent as a distillation residue and subsequently distilling said last named distillation residue to vaporize said paraffins and monoolefins thereby leaving said solvent as a distillation residue.

ART C. McKINNIS.

REFERENCES CITED

The following references are of record in the file of this patent:

UNITED STATES PATENTS

| Number | Name | Date |
|---|---|---|
| 2,050,513 | Van Peski | Aug. 11, 1936 |
| 2,096,871 | Atkins | Oct. 26, 1937 |
| 2,107,265 | Archibald | Feb. 8, 1938 |
| 2,273,923 | Bludworth | Feb. 24, 1942 |
| 2,290,636 | Deanesly | July 21, 1942 |
| 2,305,038 | Schumacher | Dec. 15, 1942 |
| 2,316,860 | Guinot | Apr. 20, 1943 |
| 2,319,694 | Lee et al. | May 18, 1943 |
| 2,388,429 | McKinnis | Nov. 6, 1945 |

FOREIGN PATENTS

| Number | Country | Date |
|---|---|---|
| 525,152 | Great Britain | Aug. 22, 1940 |